US007101035B2

(12) United States Patent
Oku et al.

(10) Patent No.: US 7,101,035 B2
(45) Date of Patent: Sep. 5, 2006

(54) IMAGE RECORDING APPARATUS

(75) Inventors: Katsuji Oku, Kyoto (JP); Hirohisa Tanaka, Kyoto (JP); Toshio Tamura, Kyoto (JP); Takanori Tsuji, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 278 days.

(21) Appl. No.: 10/892,226

(22) Filed: Jul. 16, 2004

(65) Prior Publication Data

US 2005/0024470 A1     Feb. 3, 2005

(30) Foreign Application Priority Data

Jul. 18, 2003    (JP)                 2003-198871
Mar. 30, 2004    (JP)                 2004-098212

(51) Int. Cl.
     *G03G 15/00*          (2006.01)

(52) U.S. Cl. ............................. 347/104; 399/391

(58) Field of Classification Search ............... 347/104; 399/107, 110, 124, 391, 392, 405, 407
See application file for complete search history.

(56) References Cited

U.S. PATENT DOCUMENTS 5,287,164 A *   2/1994   Watanabe .................. 399/391

6,308,027 B1 *   10/2001   Obu et al. .................. 399/110
6,348,963 B1      2/2002   Fukui
6,739,778 B1 *   5/2004   Fuchi et al. ................ 400/693

FOREIGN PATENT DOCUMENTS

JP          5-61123        3/1993
JP          5-186074       7/1993

* cited by examiner

*Primary Examiner*—Hoang Ngo
(74) *Attorney, Agent, or Firm*—McDermott Will & Emery LLP

(57) ABSTRACT

An image recording apparatus includes two recording material storage sections arranged vertically, each having a magazine, a cutter and a pair of take-out rollers, a transport device having a pair of transport rollers for transporting a recording material, the transport device supporting the recording material in a horizontal state, and a recording drum for holding the recording material on a peripheral surface thereof. The apparatus further includes a tilt mechanism for tilting the transport device to set the pair of transport rollers to a position opposed to the recording drum, and an image recorder for recording an image on the recording material held by the recording drum.

10 Claims, 8 Drawing Sheets

IMAGE RECORDING APPARATUS

BACKGROUND OF THE INVENTION

1. Field of the Invention

This invention relates to an image recording apparatus having a transport mechanism for transporting recording materials stored in a plurality of recording material storage sections to a recording material holder for recording images on the recording materials.

2. Description of the Related Art

Such a recording material transport device for use in an image recording apparatus is disclosed in Japanese Unexamined Patent Publication No. 5-61123 (1993), for example.

A photo sensitive material transport device described in the above publication includes a supply magazine for supplying a photosensitive material serving as a recording material, a transport roller group for transporting the photosensitive material to a subsequent stage, and a guide tube pivotable about a predetermined axis between a position in which an end of the tube is opposed to the supply magazine and a position in which the end of the tube is opposed to the transport roller group. Thus, the transport device is constructed to transport the photosensitive material from the supply magazine toward the transport roller group in a switchback mode.

An image recording apparatus includes a plurality of recording material supplying sections with magazines for the purpose of using plural types of recording materials different in size, for example, and for the purpose of continually supplying a recording material by changing in turn the magazines storing the recording material. These recording material supplying sections usually are arranged vertically with a view to reducing installation space.

Where a transport device pivotable about a predetermined axis as described above is used in an image recording apparatus with recording material supplying sections arranged vertically, a recording material supply angle varies from one recording material supplying section to another. This poses a problem of a destabilized performance in transporting the recording material. A large recording material supply angle tends to cause damage to the recording material. An increased number of transport rollers used to avoid the above inconvenience would complicate the transport mechanism and increase the cost of the apparatus.

SUMMARY OF THE INVENTION

The object of this invention, therefore, is to provide an image recording apparatus having a simple construction for reliably transporting a recording material, and realizing a reduced installation space.

The above object is fulfilled, according to this invention, by an image recording apparatus comprising:

a plurality of recording material storage sections arranged vertically;

a transport device including a pair of transport rollers for transporting a recording material, the transport device being vertically movable to a position having the pair of transport rollers opposed to each of the recording material storage sections for receiving and supporting, in a horizontal state, the recording material drawn from each of the recording material storage sections;

a recording material holder disposed above or below the recording material storage sections or the transport device for holding the recording material drawn from each of the recording material storage sections;

a tilt mechanism for tilting the transport device to set the pair of transport rollers to a position opposed to the recording material holder; and an image recorder disposed opposite the recording material holder for recording an image on the recording material held by the recording material holder.

This image recording apparatus has a simple construction for reliably transporting the recording material, and realizes a reduced installation space.

In a preferred embodiment of the invention, the transport device is arranged to transport the recording material from each of the recording material storage sections to the recording material holder in a switchback mode by drive of the pair of transport rollers.

With this construction, even where the recording material has a varied length, the recording material may be transported effectively to the recording material holder.

Preferably, at least one of the pair of take-out rollers comprises a roller with an increased force in a longitudinally middle position thereof for transporting the recording material, and the transport device includes a mechanism for varying a distance between the pair of transport rollers, a nip pressure applied to the recording material by the pair of transport rollers being set lower when transporting the recording material from each of the recording material storage sections to the transport device than when transporting the recording material from the transport device to the recording material holder.

This effectively prevents an oblique movement of the recording material which tends to occur in time of transport.

In another aspect of the invention, an image recording apparatus comprises:

a plurality of recording material storage sections arranged vertically, each including a magazine for storing an elongate recording material in roll form, a cutter for cutting the elongate recording material, and a pair of take-out rollers for taking the recording material out of the magazine.

a transport device including a pair of transport rollers for transporting the recording material, the transport device being vertically movable to a position having the pair of transport rollers opposed to each of the recording material storage sections for receiving and supporting, in a horizontal state, the recording material drawn from each of the recording material storage sections;

a recording drum disposed below the transport device for holding, on a peripheral surface thereof, the recording material drawn from each of the recording material storage sections;

a tilt mechanism for tilting the transport device to set the pair of transport rollers to a position opposed to the recording drum; and an image recorder disposed opposite the recording drum for recording an image on the recording material held by the recording drum.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Figure 1:
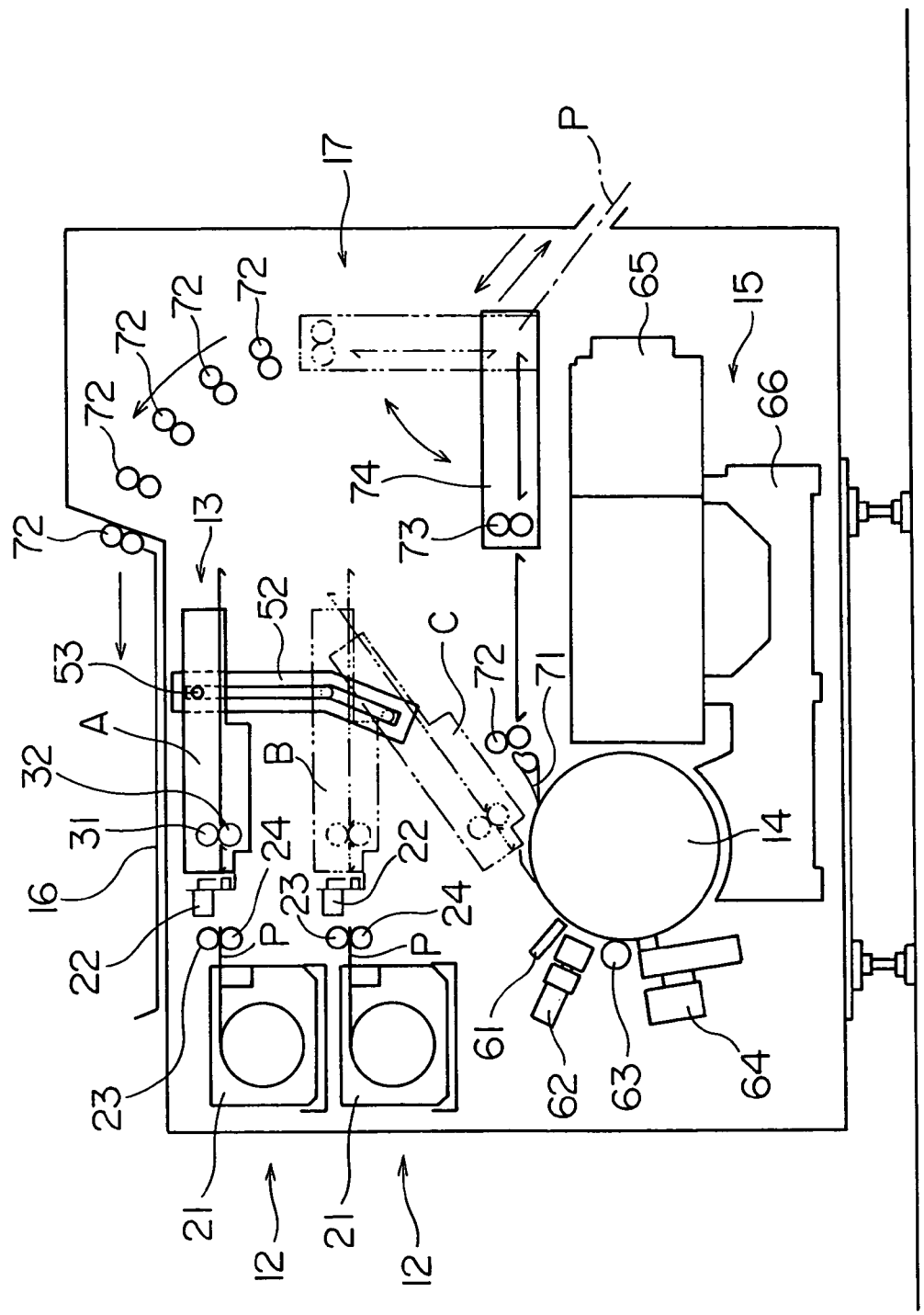
FIG. 1 is a schematic view of an image recording apparatus according to this invention.

An embodiment of this invention will be described hereinafter with reference to the drawings. FIG. 1 is a schematic view of an image recording apparatus according to this invention.

The image recording apparatus includes two recording material storage sections 12 arranged vertically, a recording material transport device 13 used for transporting a recording material P, a lift mechanism for raising and lowering the transport device 13, a tilt mechanism for tilting the transport device 13, a recording drum 14 for supporting the recording material P mounted peripherally thereof, an image recorder 15 for recording an image on the recording material P mounted on the recording drum 14, and a discharge mechanism 17 for discharging the recording material P having the image recorded thereon to a discharge tray 16.

Each of the recording material storage sections 12 includes a magazine 21 storing an elongate recording material P in roll form therein, a cutter 22 for cutting the elongate recording material P, and a pair of take-out rollers 23 and 24 for taking the recording material P out of the magazine 21.

Figure 2A:
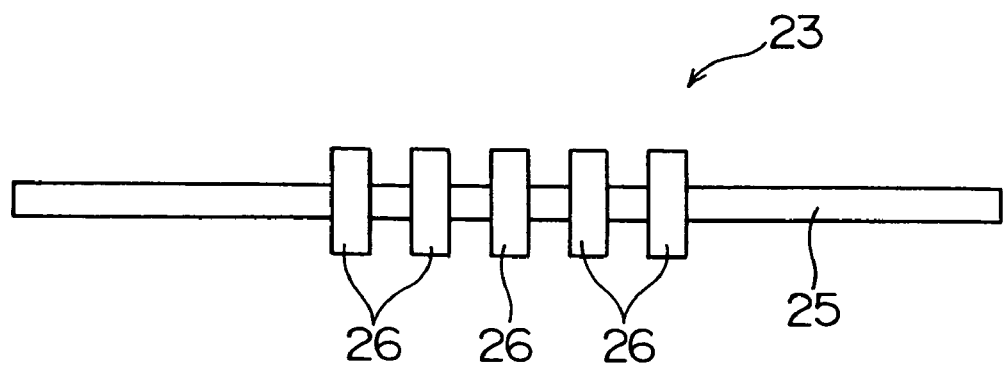
FIG. 2A is a front view showing a construction of a take-out roller.

Of the pair of take-out rollers 23 and 24, the upper take-out roller 23, as shown in FIG. 2A, includes a plurality of wheel-shaped roller elements 26 arranged on a middle portion of an axis 25. The take-out roller 23 with such a construction has an increased force in a longitudinally middle portion thereof for transporting the recording material P. Thus, when the pair of take-out rollers 23 and 24 transport the recording material P, the recording material P is transported as pulled at a transversely middle portion thereof. This effectively prevents an oblique movement of the recording material P in time of transport.

Figure 2B:
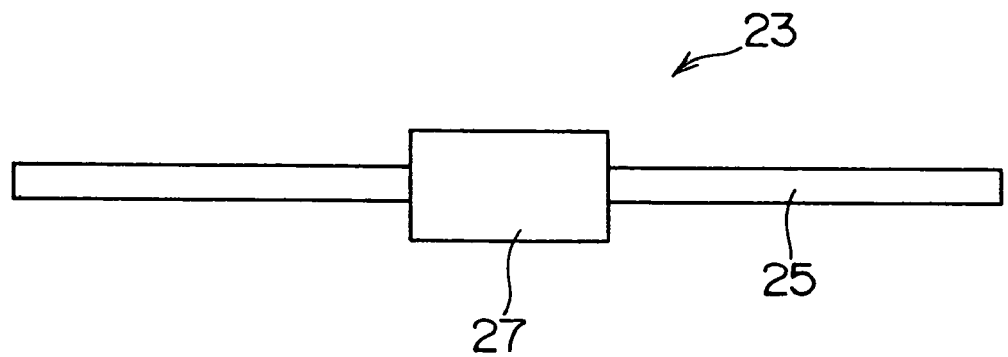
FIG. 2B is a front view showing a construction of a modified take-out roller.
Figure 2C:
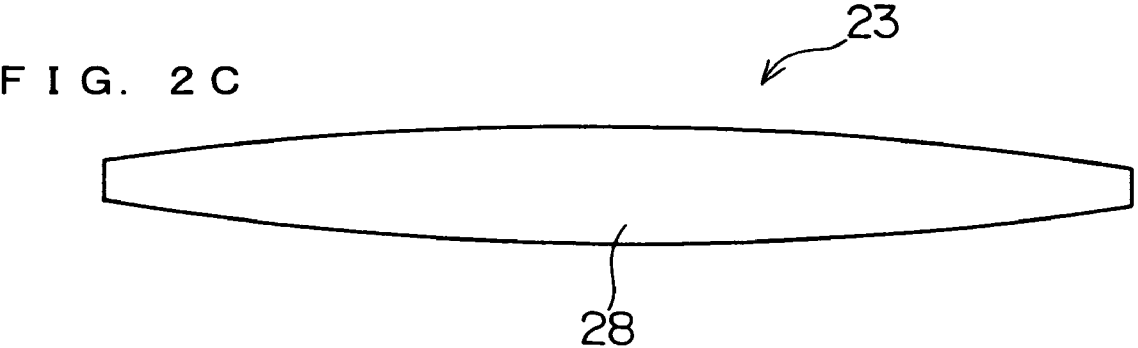
FIG. 2C is a front view showing a construction of another modified take-out roller.

In order to secure an increased force in the longitudinally middle portion of the take-out roller 23 for transporting the recording material P, a roller element 27 of small width may be mounted on the middle portion of axis 25 as shown in FIG. 2B. Alternatively, a crown-shaped roller 28 may be adopted as shown in FIG. 2C.

Referring to FIG. 1 again, the recording material transport device 13 supports, in a horizontal state, the recording material P drawn from either recording material storage section 12, and transports the recording material P toward the recording drum 14 in a switchback mode. The transport device 13 includes a pair of transport rollers 31 and 32 for transporting the recording material P.

The switchback mode is a transport mode in which a load (recording material P) is transported in a first direction, and then transported along the same track as when transported in the first direction, but in a second direction different from the first direction (preferably in a direction opposite to the first direction).

This recording material transport device 13 is movable, by action of the lift mechanism and tilt mechanism, between a position, referenced A in FIG. 1, opposed to the upper recording material storage section 12, a position referenced B opposed to the lower recording material storage section 12, and a position referenced C opposed to the recording drum 14 in an inclined state.

Figure 3:
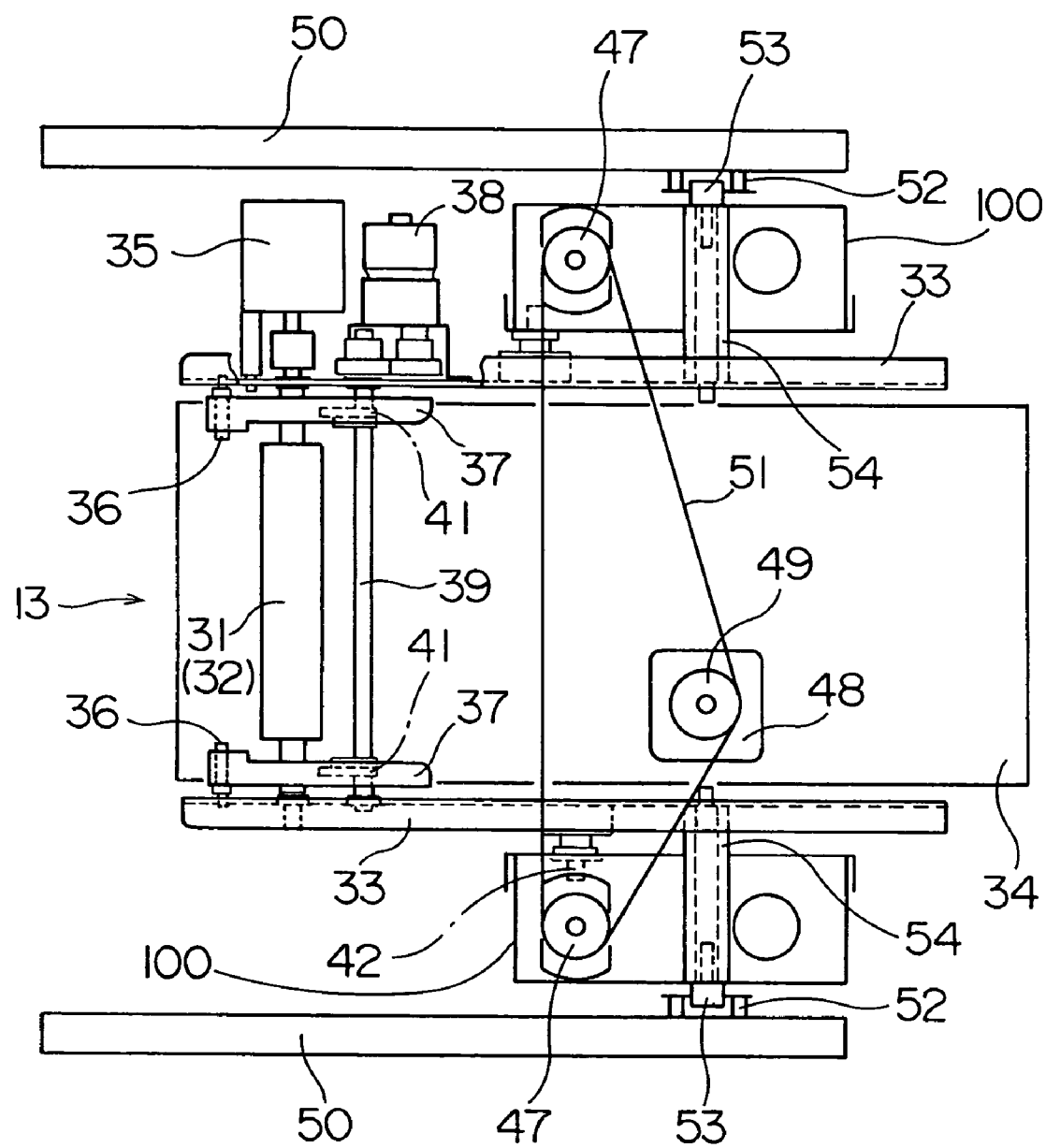
FIG. 3 is a plan view showing a recording material transport device with a lift mechanism and a tilt mechanism.
Figure 4A:
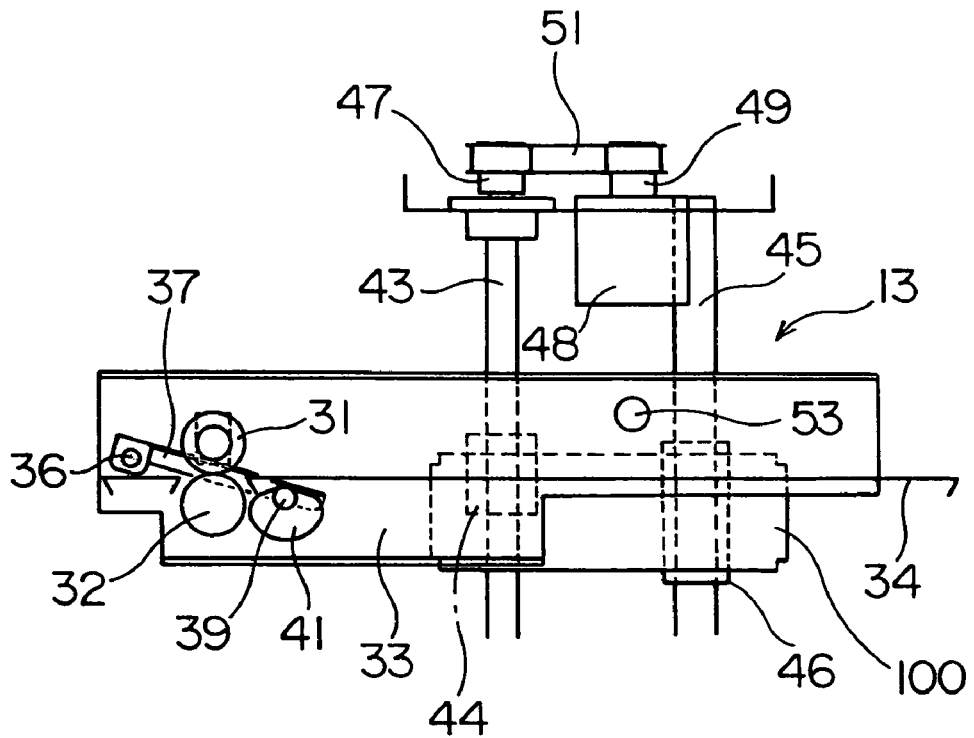
FIG. 4A is a side view showing a principal portion of FIG. 5.
Figure 4B:
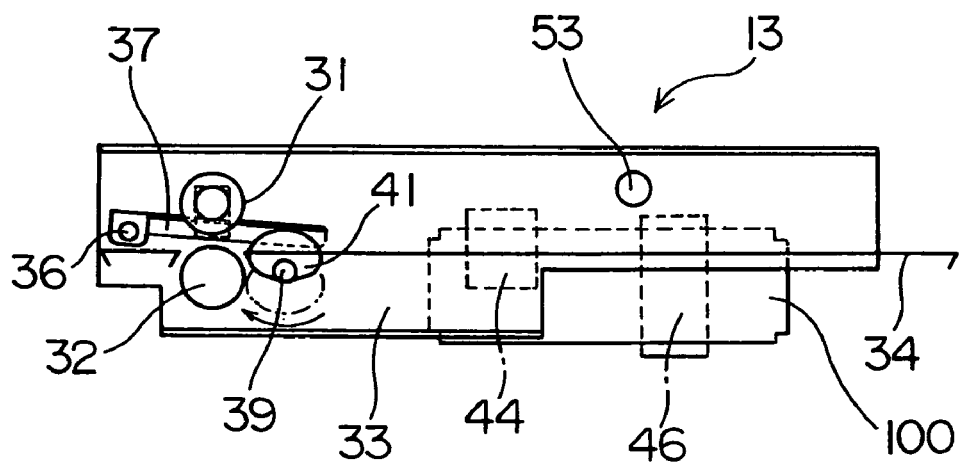
FIG. 4B is a side view showing a principal portion of FIG. 5.
Figure 5:
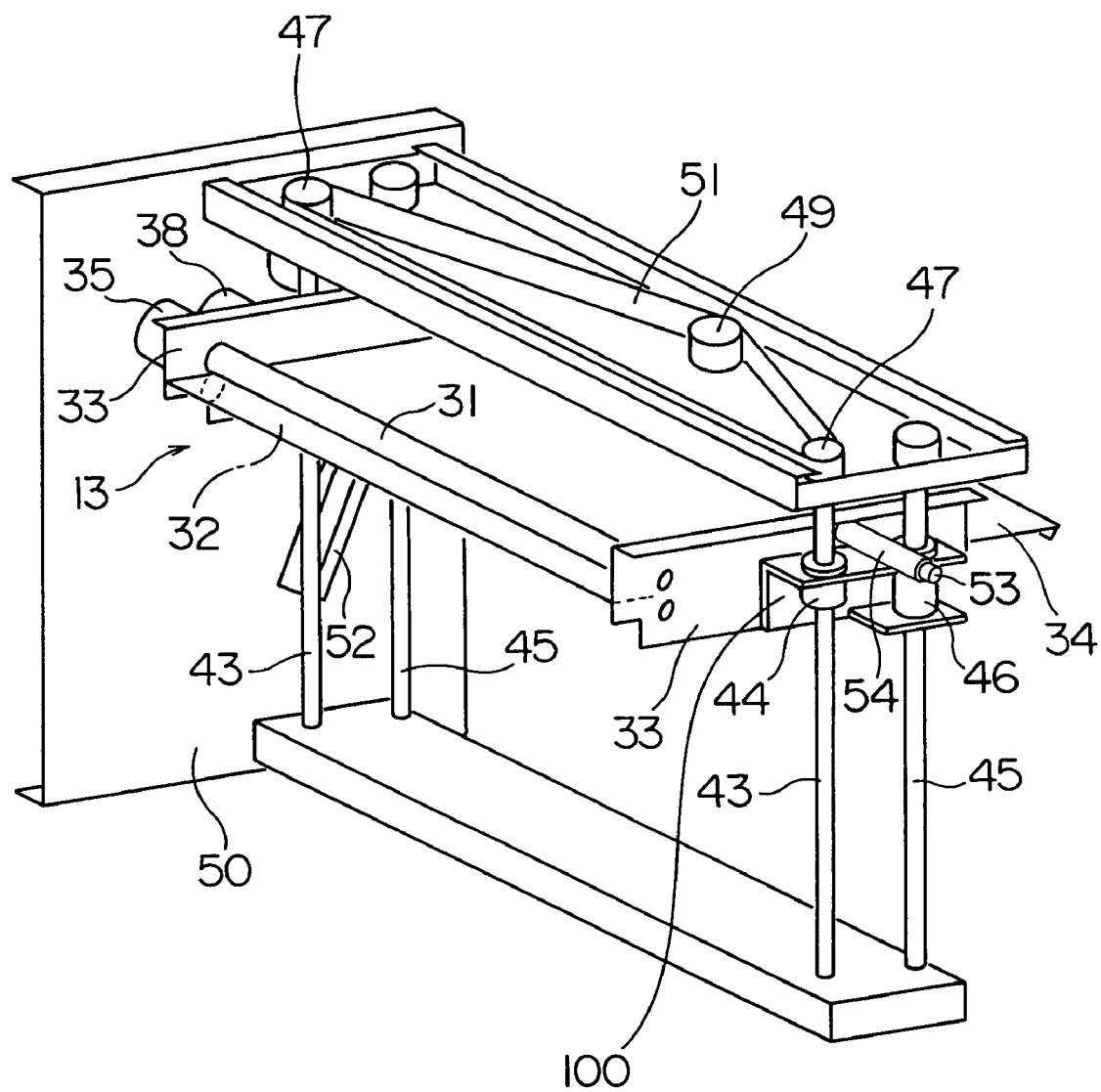
FIG. 5 is a perspective view showing the recording material transport device with the lift mechanism and tilt mechanism.

Details of the recording material transport device 13, lift mechanism and tilt mechanism will be described hereinafter. FIG. 3 is a plan view showing the recording material transport device 13 with the lift mechanism and tilt mechanism. FIGS. 4A and 4B are side views showing principal portions of these components. FIG. 5 is a perspective view showing the transport device 13 with the lift mechanism and tilt mechanism. Certain components are omitted from FIG. 5.

The recording material transport device 13 has a pair of support members 33, and a support plate 34 for supporting the recording material P from below. Of the pair of transport rollers 31 and 32, the lower transport roller 32 is rotatably supported by the pair of support members 33. This transport roller 32 is connected to a motor 35, and is rotated by drive of this motor 35. On the other hand, the upper transport roller 31 is rotatably supported by the pair of support members 33 to be movable also vertically.

The pair of support members 33 have levers 37 pivotable about axes 36, respectively. These levers 37 are pivotable by cams 41 fixed to opposite ends of an axis 39 rotatable by drive of a motor 38. The pivotal movement of the levers 37 vertically moves the upper transport roller 31. That is, the pivotal movement of the levers 37 caused by drive of the motor 38 varies a spacing between the pair of transport rollers 31 and 32.

As shown in FIG. 3, a pair of connecting members 54 are fixed to and project from outer lateral surfaces of the support members 33 of the recording material transport device 13. Each connecting member 54 has a cam follower 53 rotatably attached to a distal end thereof. The cam follower 53 is movable along a cam 52 disposed on an inner surface of a side plate 50 of the image recording apparatus.

Each support member 33 of the recording material transport device 13 further includes a rotary shaft 42 attached to the outer lateral surface thereof. The rotary shafts 42 are rotatably connected to a pair of lift members 100. Thus, the transport device 13 is pivotable about the rotary shafts 42 relative to the pair of lift members 100.

As shown in FIGS. 4A and 4B, each lift member 100 includes a nut 44 and a slider 46. The nut 44 is meshed with a ball screw 43 extending vertically, while the slider 46 is guided by a guide member 45 extending vertically.

The pair of ball screws 43 have driven pulleys 47 mounted on upper ends thereof. A belt 51 is wound around these driven pulleys 47 and a drive pulley 49 connected to a motor 48. Thus, the ball screws 43 are rotatable by drive of the motor 48 transmitted through the drive pulley 49, belt 51 and driven pulleys 47. With rotation of the ball screws 43, the pair of lift members 100 move vertically along the guide members 45, thereby vertically moving the recording material transport device 13.

The cams 52 are fixed to the pair of side plates 50 of the image recording apparatus, respectively. As shown in FIGS. 1 and 5, each cam 52 is shaped to have an upper portion extending vertically, and a lower portion extending obliquely. The cam followers 53 are engaged with these cams 52, respectively. As shown in FIG. 3, the cam followers 53 are connected to the pair of support members 33 of the recording material transport device 13 through the connecting members 54.

The center of gravity of the recording material transport device 13 lies closer to the transport rollers 31 and 32 than to the rotary shafts 42 shown in FIG. 3. As the transport device 13, driven by the motor 48 noted above, descends from the position, referenced A in FIG. 1, at the upper end of a range of its movement to the position referenced B, the transport device 13 is maintained in horizontal posture by action of the guide members 45 extending vertically and the upper portions of the cams 52 extending vertically. When the transport device 13 continues to move further downward, the guide members 45 extending vertically and the lower portions of the cams 52 extending obliquely cause the transport device 13 to pivot about the rotary shafts 42 relative to the lift members 100, thereby gradually inclining to assume the tilted position referenced C in FIG. 1.

The position referenced A in FIG. 1 is where the pair of transport rollers 31 and 32 are opposed to the upper recording material storage section 12. The position referenced B is where the pair of transport rollers 31 and 32 are opposed to the lower recording material storage section 12. The position referenced C is where the pair of transport rollers 31 and 32 are opposed to the recording drum 14.

Referring to FIG. 1, arranged in positions opposed to outer peripheries of the recording drum 14 are a mechanism 61 for opening and closing forward end clamps that clamp a forward end of recording material P mounted on the recording drum 14, a mechanism 62 for opening and closing rear end clamps that clamp a rear end of recording material P, a squeeze roller 63 and a punching mechanism 64.

The image recorder 15 for recording images on the recording material P mounted on the recording drum 14 includes a recording head 65, and a moving mechanism for moving the recording head 65 axially of the recording drum 14 (in directions perpendicular to the plane of FIG. 1). With the recording drum 14 rotated at high speed and the recording head 65 moved axially of the recording drum 14, the image recorder 15 records images by emitting laser beams, for example, to the recording material P.

The discharge mechanism 17 for discharging the recording material P after an image recording step to the discharge tray 16 includes claws 71 for separating the recording material P from the peripheral surface of the recording drum 14, a plurality of transport roller pairs 72 and a direction change member 74. The direction change member 74 has a transport roller pair 73 disposed at one end thereof, and is movable from a position shown in solid lines to a position shown in two-dot chain lines in FIG. 1, thereby changing the moving direction of the recording material P in a switchback mode. Thus, discharge mechanism 17 removes the recording material P with an image recorded thereon from the peripheral surface of the recording drum 14 and transports the recording material P to the discharge tray 16.

Next, an operation of the image recording apparatus having the above construction to transport the recording material P stored in one of the recording material storage sections 12 to the recording drum 14 will be described. FIGS. 6A, 6B, 7A, 7B, 8A and 8B are explanatory views showing transport of the recording material P.

Figure 6A:
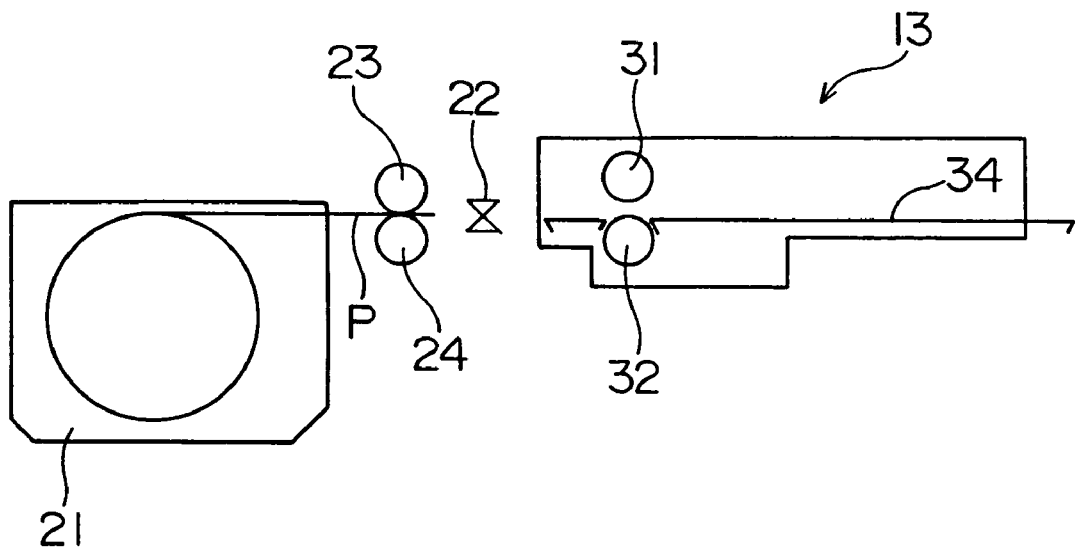
FIG. 6A is an explanatory view showing transport of a recording material.
Figure 6B:
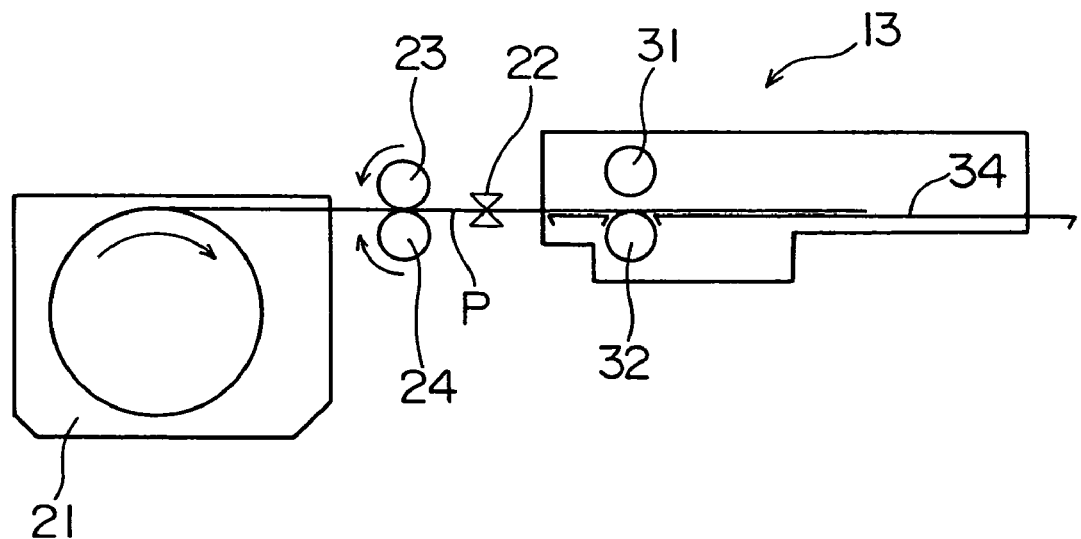
FIG. 6B is an explanatory view showing transport of the recording material.

When transporting the recording material P, as shown in FIG. 6A, the pair of take-out rollers 23 and 24 draw out the recording material P stored in roll form in the magazine 21. With the take-out rollers 23 and 24 continuing to rotate, as shown in FIG. 6B, the recording material P is transported onto the support plate 34 of the recording material transport device 13. The support plate 34 is sized to support the recording material P in a horizontal state. The support plate 34 will serve the purpose as long as it supports a major portion of the recording material P in a horizontal state, with part (e.g. about 150 mm) of the recording material P protruding from the support plate 34.

When the recording material P is transported from the recording material storage section 12 to the recording material transport device 13, the upper transport roller 31 is moved up by action of the levers 37 shown in FIGS. 4A and 4B, to form a space between the pair of transport rollers 31 and 32. Thus, the recording material P is transported by the transport rollers 31 and 32, the upper transport roller 31 having, as shown in FIG. 2A, the plurality of wheel-shaped roller elements 26 arranged on the middle portion of the axis 25, with an increased force in the longitudinally middle portion thereof for transporting the recording material P. This effectively prevents an oblique movement of the recording material P in time of transport.

Figure 7A:
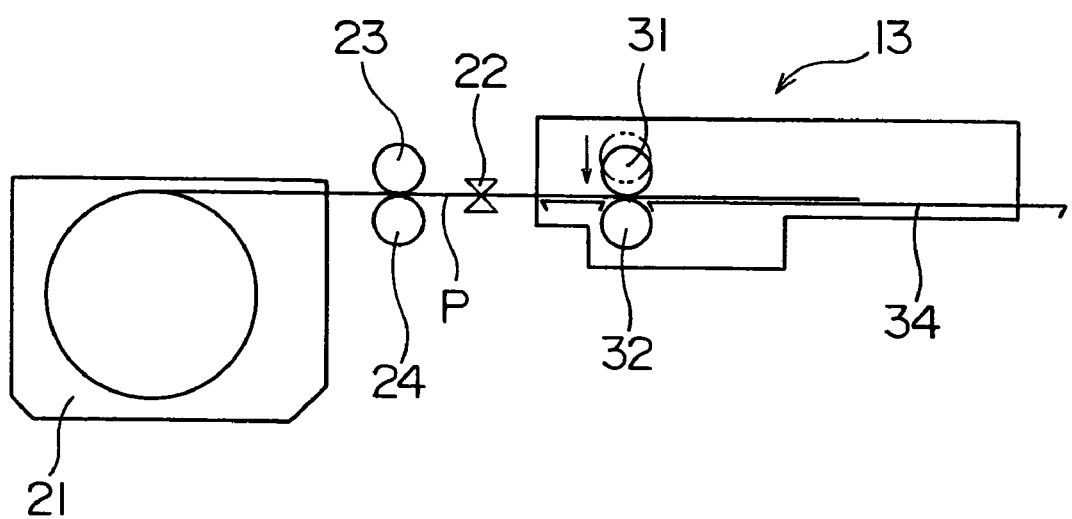
FIG. 7A is an explanatory view showing transport of the recording material.

When the recording material P has been drawn by a length required for recording an image, as shown in FIG. 7A, the levers 37 shown in FIGS. 4A and 4B are operated to lower the upper transport roller 31 to nip the recording material P between the pair of transport rollers 31 and 32. Then, the cutter 22 is operated to cut the recording material P.

Figure 7B:
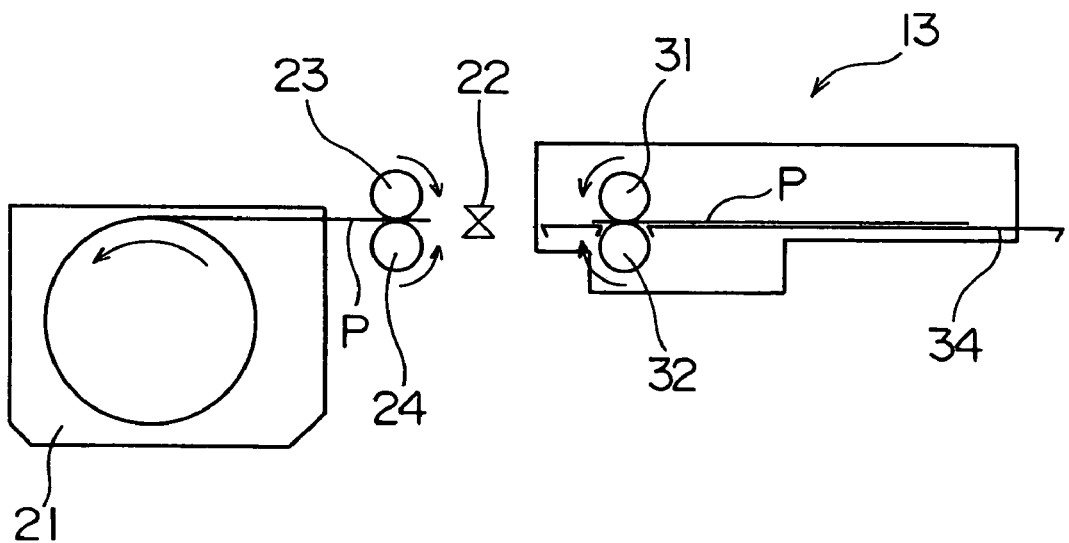
FIG. 7B is an explanatory view showing transport of the recording material.

Next, as shown in FIG. 7B, the pair of transport rollers 31 and 32 are rotated, and the recording material P is fully stored in the recording material transport device 13. The pair of take-out rollers 23 and 24 are rotated reversely to rewind the recording material P slightly.

Figure 8A:
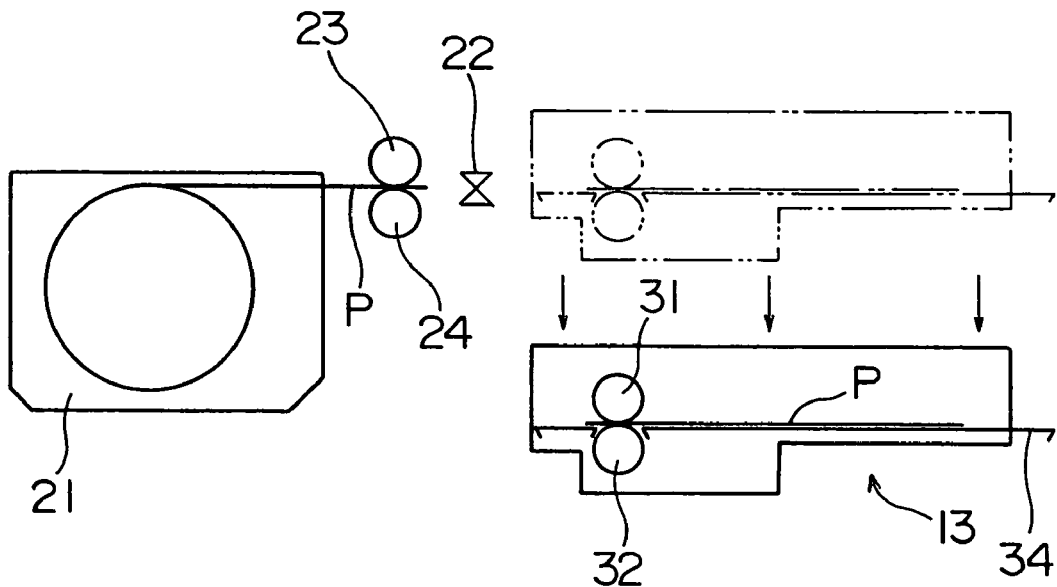
FIG. 8A is an explanatory view showing transport of the recording material.
Figure 8B:
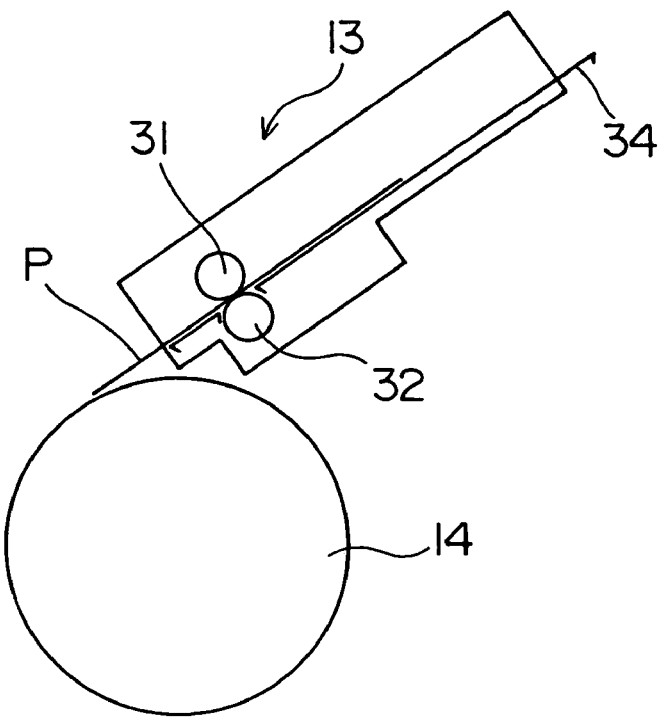
FIG. 8B is an explanatory view showing transport of the recording material.

When, in this state, the recording material transport device 13 is disposed in the position A in FIG. 1 opposed to the upper recording material storage section 12, as shown in FIG. 8A, the ball screws 43 are rotated by the motor 48 to lower the transport device 13 to the position B in FIG. 1 opposed to the lower recording material storage section 12. The ball screws 43 are further rotated by the motor 48 whereby, as shown in FIG. 8B, the transport device 13 is moved to the position C in FIG. 1 tilted and opposed to the recording drum 14.

Then, the pair of transport rollers 31 and 32 are rotated reversely to transport the recording material P supported on the support plate 34 toward the recording drum 14. When the forward end of the recording material P reaches the recording drum 14, the forward end clamps hold the forward end tightly, and thereafter the recording drum 14 is rotated at low speed to receive the recording material P on the peripheral surface thereof. The recording material P is transported to the recording drum 14 in the switchback mode as described above. Thus, even where the recording material P has a varied length, the recording material P may be transported to the recording drum 14 effectively by adjusting an amount of transport.

In the embodiment described above, the recording drum 14 is disposed under the recording material transport device 13 to realize a reduced installation area of the image recording apparatus. Instead, the recording drum 14 may be disposed under the recording material storage sections 12. The recording drum 14 may be disposed over the recording material storage sections 12 or the recording material transport device 13. The installation area of the image recording apparatus may be reduced by adopting such a construction also.

In the foregoing embodiment, when the recording material P is drawn from the magazine 21 and transported onto the support plate 34 of the transport device 13, a space is formed between the pair of transport rollers 31 and 32, and the recording material P is transported only by the pair of take-out rollers 23 and 24. However, the recording material P may be transported by using an auxiliary transporting force of the transport rollers 31 and 32 lightly pressed against each other, in addition to the transporting force of the take-out rollers 23 and 24. In this case also, an oblique movement of the recording material P may be effectively prevented in time of transport. The phrase "a nip pressure applied to the recording material by the pair of transport rollers being set lower" used herein refers to a concept embracing the above two forms.

In the foregoing embodiment, the cutter 22 is included in each recording material storage section 12. Instead, the cutter 22 may be included in the recording material transport device 13. In this case, only one cutter 22 is needed, which is less costly than where the cutter 22 is provided for each recording material storage section 12. Furthermore, whichever storage section 12 the recording material P is drawn from for use, the single cutter 22 will provide the same cutting plane for the recording material P, resulting in a uniform quality of the image recording material P.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Applications No. 2003-198871 filed in the Japanese Patent Office on Jul. 18, 2003 and No. 2004-98212 filed in the Japanese Patent Office on Mar. 30, 2004, the entire disclosure of which is incorporated herein by reference.

What is claimed is:

1. An image recording apparatus comprising:
a plurality of recording material storage sections arranged vertically;
transport device including a pair of transport rollers for transporting a recording material, said transport device being vertically movable to a position having said pair of transport rollers opposed to each of said recording material storage sections for receiving and supporting, in a horizontal state, the recording material drawn from each of said recording material storage sections;
a recording material holder disposed above or below said recording material storage sections or said transport device for holding the recording material drawn from each of said recording material storage sections;
a tilt mechanism for tilting said transport device to set said pair of transport rollers to a position opposed to said recording material holder; and
an image recorder disposed opposite said recording material holder for recording an image on the recording material held by said recording material holder.

2. An image recording apparatus as defined in claim 1, wherein said transport device is arranged to transport the recording material from each of said recording material storage sections to said recording material holder in a switchback mode by drive of said pair of transport rollers.

3. An image recording apparatus as defined in claim 2, wherein each of said recording material storage sections includes a magazine for storing an elongate recording material in roll form, a cutter for cutting the elongate recording material, and a pair of take-out rollers for taking the recording material out of said magazine.

4. An image recording apparatus as defined in claim 3, wherein:
at least one of said pair of take-out rollers comprises a roller with an increased force in a longitudinally middle position thereof for transporting the recording material; and
said transport device includes a mechanism for varying a distance between said pair of transport rollers;
a nip pressure applied to the recording material by said pair of transport rollers being set lower when transporting the recording material from each of said recording material storage sections to said transport device than when transporting the recording material from said transport device to said recording material holder.

5. An image recording apparatus as defined in claim 4, wherein said pair of transport rollers are opened to reduce said nip pressure to zero when transporting the recording material from each of said recording material storage sections to said transport device.

6. An image recording apparatus as defined in claim 2, wherein:
each of said recording material storage sections includes a magazine for storing an elongate recording material in roll form and a pair of take-out roller, and
said transport device includes a cutter for cutting the elongate recording material drawn from the magazine.

7. An image recording apparatus comprising:
a plurality of recording material storage sections arranged vertically, each including a magazine for storing an elongate recording material in roll form, a cutter for cutting the elongate recording material, and a pair of take-out rollers for taking the recording material out of said magazine,
transport device including a pair of transport rollers for transporting the recording material, said transport device being vertically movable to a position having said pair of transport rollers opposed to each of said recording material storage sections for receiving and supporting, in a horizontal state, the recording material drawn from each of said recording material storage sections;
a recording drum disposed below said transport device for holding, on a peripheral surface thereof, the recording material drawn from each of said recording material storage sections;
a tilt mechanism for tilting said transport device to set said pair of transport rollers to a position opposed to said recording drum; and
an image recorder disposed opposite said recording drum for recording an image on the recording material held by said recording drum.

8. An image recording apparatus as defined in claim 7, wherein said transport device is arranged to transport the recording material from each of said recording material storage sections to said recording drum in a switchback mode by drive of said pair of transport rollers.

9. An image recording apparatus as defined in claim 8, wherein:
- at least one of said pair of take-out rollers comprises a roller with an increased force in a longitudinally middle position thereof for transporting the recording material; and
- said transport device includes a mechanism for varying a distance between said pair of transport rollers;
- a nip pressure applied to the recording material by said pair of transport rollers being set lower when transporting the recording material from each of said recording material storage sections to said transport device than when transporting the recording material from said transport device to said recording drum.

10. An image recording apparatus as defined in claim 9, wherein said pair of transport rollers are opened to reduce said nip pressure to zero when transporting the recording material from each of said recording material storage sections to said transport device.

* * * * *